(12) United States Patent
Egger et al.

(10) Patent No.: US 8,461,826 B2
(45) Date of Patent: Jun. 11, 2013

(54) DEVICE FOR THE DETECTION QUADRATURE SIGNALS

(75) Inventors: Andreas Egger, Vienna (AT); Wolfgang Köllner, Vienna (AT); Peter Stephan Mulacz, Pottenbrunn (AT); Caroline Renault, Vienna (AT)

(73) Assignee: Continental Automotive GmbH, Hannover (DE)

( * ) Notice: Subject to any disclaimer, the term of this patent is extended or adjusted under 35 U.S.C. 154(b) by 630 days.

(21) Appl. No.: 12/666,904

(22) PCT Filed: Jun. 23, 2008

(86) PCT No.: PCT/EP2008/057958
§ 371 (c)(1),
(2), (4) Date: Dec. 28, 2009

(87) PCT Pub. No.: WO2009/000808
PCT Pub. Date: Dec. 31, 2008

(65) Prior Publication Data
US 2010/0201350 A1 Aug. 12, 2010

(30) Foreign Application Priority Data
Jun. 28, 2007 (DE) .......................... 10 2007 029 824

(51) Int. Cl.
*G01P 3/42* (2006.01)
*G01P 3/48* (2006.01)

(52) U.S. Cl.
USPC .......................................... 324/160; 324/161

(58) Field of Classification Search
USPC ........................................ 324/160–161, 165
See application file for complete search history.

(56) References Cited

U.S. PATENT DOCUMENTS 5,486,759 A    1/1996  Seiler et al. ................. 324/207.2

FOREIGN PATENT DOCUMENTS

| DE | 7638775 | 4/1981 |
|---|---|---|
| DE | 4308030 | 5/1994 |
| DE | 19527982 | 2/1997 |
| DE | 19835377 | 2/2000 |
| JP | 8149899 | 6/1996 |
| JP | 2005062951 | 3/2005 |
| JP | 2005106567 | 4/2005 |

OTHER PUBLICATIONS

International Search Report for Application No. PCT/EP2008/057958 (9 page).

*Primary Examiner* — Bot Ledynh
(74) *Attorney, Agent, or Firm* — King & Spalding L.L.P.

(57) ABSTRACT

A device (10) for the detection of quadrature signals of a signal unit (11; 21) has a common power supply line (VBATT_A & B) and a common ground wire (GND), and emits at least two out-of-phase square wave signals (IA, IB; IS, ID) during operation for analyzing the same in an analysis unit (16), wherein both out-of-phase square wave signals (IA, IB; IS, ID) are applied to the common power supply line (VBATT_A & B) at different amplitudes, wherein the two out-of-phase square wave signals (IA, IB; IS, ID) are modulated onto the supply current (I0)), and wherein the analysis unit (16) is or can be connected to the power supply line.

20 Claims, 6 Drawing Sheets

DEVICE FOR THE DETECTION QUADRATURE SIGNALS

CROSS-REFERENCE TO RELATED APPLICATIONS

This application is a U.S. National Stage Application of International Application No. PCT/EP2008/057958 filed Jun. 23, 2008, which designates the United States of America, and claims priority to German Application No. 10 2007 029 824.4 filed Jun. 28, 2007, the contents of which are hereby incorporated by reference in their entirety.

TECHNICAL FIELD

The invention relates to an apparatus for detecting quadrature signals of a signal unit, which comprises a common power supply line and a common ground line, and which during operation emits at least two out of phase square signals for analysis in an analysis unit.

BACKGROUND

Such apparatuses are used for example in motor vehicles in drive systems for window winders, sunroofs and also in sliding doors, tailgates and the like, to detect the position, speed or direction of movement of the motor and therefore of the driven component. Hall sensors for example, as well as optical coders, capacitive and inductive sensors and the like can be used as sensors, generally quadrature encoders. Lines have to be installed for such sensors, specifically for their voltage supply, as for the output signals, said lines being passed by way of cable harnesses to a control unit. The sensors here can either be integrated in the motor or can also be embodied as so-called stand-alone sensors. The lines in such a system incur costs, the costs increasing with the number of lines. The cable harnesses located in the vehicle increase the weight of the vehicle. Also the maximum possible diameter for the execution of cable harnesses is limited, for example by a vehicle door in the vehicle chassis. Also the additional line in a cable harness increases the probability of failure, for example because of the plug-in contacts required in the vehicle. This has the further disadvantage that each line connection entails a technical risk, as each line is sensitive to interference.

Different routes have been followed in the past to supply power to sensors and to extract sensor signals, as shown in FIGS. 1 to 4, all of which show solutions according to the prior art.

Figure 1:
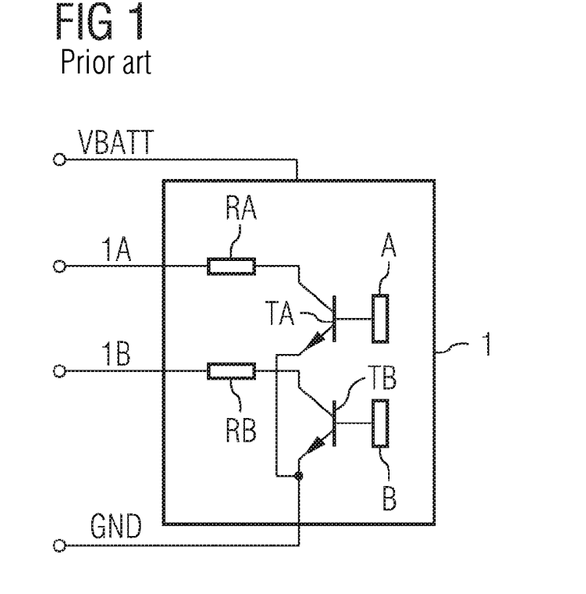
FIGS. 1 to 4 show schematic circuit diagrams of conventional sensor units.

FIG. 1 for example shows a double sensor unit 1, which is known per se and comprises two sensors A, B, the output signals of which are applied to outputs 1A and 1B by way of transistors TA and/or TB and resistors RA and/or RB. Two lines are also required to supply power, namely a common power supply line VBATT and a common ground line GND. With this embodiment the data signals at the outputs 1A and 1B contain the full information content relating to the position and speed of the electric motor, i.e. more precisely of the rotor of such an electric motor. A—conventional—electronic analysis system (not shown), which is connected to the outputs 1A and 1B, can therefore always detect the motor position and speed for example correctly.

Figure 2:
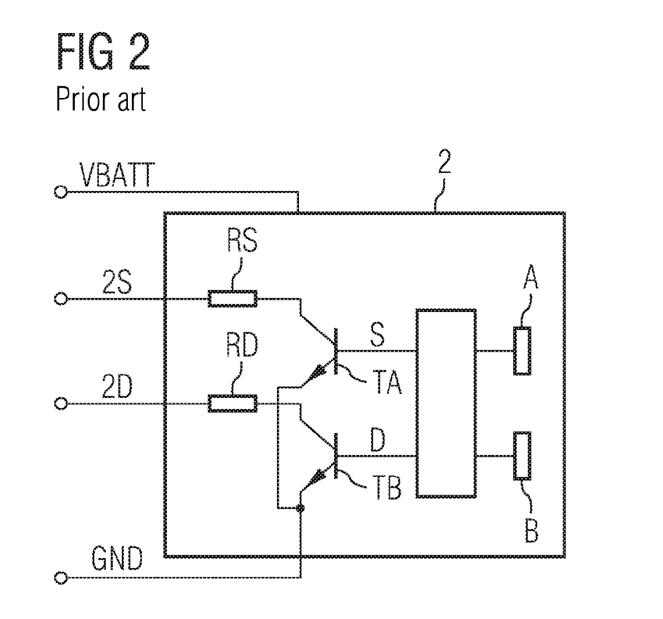

FIG. 2 shows a speed/direction sensor unit 2, which in turn comprises two independent sensors A, B, which are applied here by way of a logic module 2AB with comparable output transistors TS, TD and resistors RS and/or RD to outputs 2S and/or 2D. The logic module 2AB analyzes the position signals of the sensors A and B directly to obtain a speed signal S and a direction signal D, with corresponding speed and/or direction signals being output at the outputs 2S and 2D. A power supply line VBATT and a ground line GND are also present here for voltage supply purposes, in other words a total of four lines. It is possible to detect the required parameters here too in respect of a standard electronic analysis unit.

One disadvantage of the two known embodiments is that a total of four lines are required, resulting in the disadvantages listed in the introduction.

In the embodiments according to FIGS. 1 and 2 the resistors RA, RB and/or RS, RD, which are connected in series to so-called open collector outputs of the transistors TA, TB and/or TS, TD, protect the sensor outputs from a short circuit to VBATT.

Figure 3:
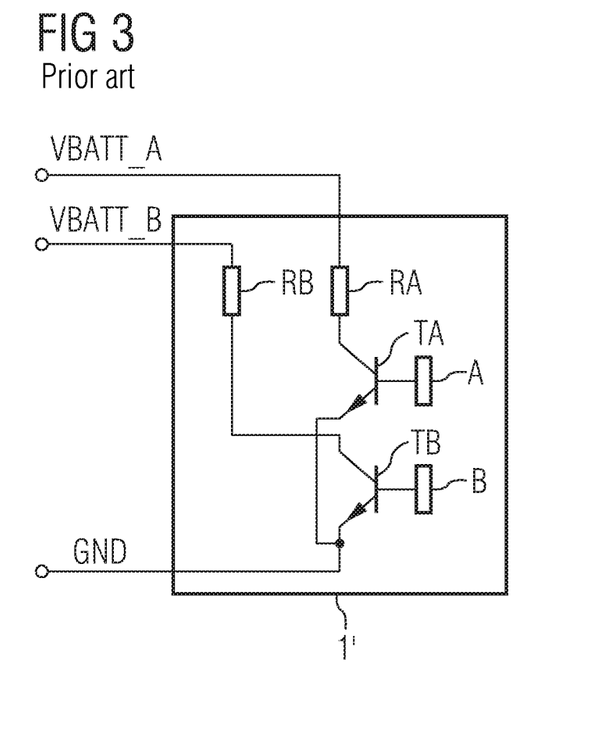

As a modification of the embodiment according to FIG. 1 it has already been proposed, see FIG. 3, that in a comparable dual sensor unit 1' the two sensor output signals should be modulated as two out of phase square signals onto the supply currents of the sensors A, B of the sensor unit 1'. Independent power supply lines VBATT_A and VBATT_B are therefore provided for the two sensors A, B and the respective square signals, i.e. high/low level, are modulated onto the supply currents carried by way of these lines, this being possible for example with the aid of the resistors RA, RB. The two resistors RA and RB can be identical here, i.e. RA=RB=R.

Instead of by way of resistors, current modulation can however also take place in the conventional manner by way of power sources.

Here too the data signals contain the full information content relating to the position and speed of the motor, so that the electronic analysis unit can always detect the corresponding parameters correctly but three lines are still required for this sensor unit 1'.

Figure 4:
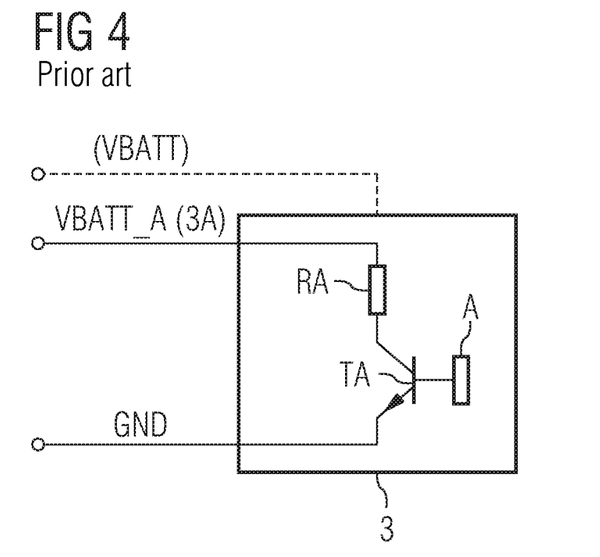

FIG. 4 shows a variant of a sensor unit 3 with just two lines VBATT_A and GND, with in this instance only a single sensor A being contained in the sensor unit 3. The—single—sensor output signal can for example be modulated in turn by way of a transistor TA and a resistor RA onto the supply current on the power supply line VBATT_A, and the ground line GND is present as the second line.

Alternatively the output line VBATT_A, which is connected directly to the resistor RA, could be replaced by a specific data output line 3A and a separate power supply line VBATT could be provided, as shown with a broken line in FIG. 4. In the latter instance three connecting lines would be necessary, in the first two connecting lines. However the variant according to FIG. 4 has the disadvantage that the output data signal no longer contains the full information content relating to position and speed. An electronic analysis unit can therefore only detect the position of the motor partially correctly and runout and reverse estimators are necessary to try to estimate the correct position. If for example in the case of a non-actuated motor edges occur on the sensor output line VBATT_A or 3A, it is only possible to assume the direction of movement. The requirements for system self-locking are also very stringent.

SUMMARY

According to various embodiments, an apparatus as set out in the introduction can be provided, with which it is possible to ensure the full information content relating to transmission of the required motor parameters, in particular position and speed, with a minimum number of connecting lines of a signal unit, in particular a sensor unit.

According to an embodiment, an apparatus comprises a signal unit and an evaluation unit which is or can be connected to the signal unit, for detecting quadrature signals of the signal unit. The signal unit comprises a single power supply line and a ground line and during operation emitting at least two out of phase square signals for analysis in the analysis unit, wherein the signal unit applies the two out of phase square signals at different amplitudes to the single power supply line, both square signals being modulated onto the supply current supplied by way of the power supply line, and wherein the analysis unit contains a comparator, one input of which is or can be connected to the single power supply line, while a predetermined threshold value is applied to the other input.

According to a further embodiment, the two square signals can be applied by way of mutually different resistors to the common power supply line. According to a further embodiment, the threshold value may have a level between the two amplitudes of the two square signals, plus the amplitude of the supply current. According to a further embodiment, the output of the comparator can be connected to an input of a logic unit, which is connected at a further input to the power supply line to supply the square signals modulated onto the supply current. According to a further embodiment, the logic unit can be set up to analyze the modulated square signals at rising and/or falling edges of the comparator output signal by comparison with predetermined values. According to a further embodiment, the signal unit can be a sensor unit with at least two sensors. According to a further embodiment, the sensors can be position sensors of an electric motor. According to a further embodiment, the signals per se can be applied to the common supply current line. According to a further embodiment, the signal unit may contain a logic module, which is set up to derive signals formed by linking the original signals, the square signals being modulated onto the supply current according to these derived signals. According to a further embodiment, the signals formed by linking the original signals can be speed and rotational direction signals formed from position sensor output signals.

BRIEF DESCRIPTION OF THE DRAWINGS

The invention is described in more detail below with reference to preferred exemplary embodiments, to which however the invention is not intended to be restricted, said exemplary embodiments being illustrated in the drawing, in which.

DETAILED DESCRIPTION

It is possible with the present apparatus by means of appropriate modulation of the supply current to transmit the full information content of the signals of the signal unit, e.g. relating to position, speed and/or rotational direction (movement direction) in the case of an electric motor. A total of only two lines are required here on the one hand to provide the power supply and on the other hand to carry out full information detection. There is also the advantage that conventional, existing integrated circuits can also be used and simple analysis of the signals is possible, e.g. in a control unit.

According to various embodiments, the square output signals are modulated onto the supply current at different amplitudes or levels, so that a corresponding differentiation is possible in the analysis unit. In this context a particularly simple solution is characterized in that the two square signals are applied by way of mutually different resistors to the common power supply line. The two resistors here therefore not only have the purpose of allowing modulation of the two out of phase square signals onto the common supply current but also the function of ensuring different amplitudes of the two square signals. However it is in principle also possible of course here to achieve current modulation with the aid of correspondingly designed power sources.

In order during the analysis to separate the two square signals modulated into the supply current, it is particularly advantageous if the analysis unit contains a comparator, one input of which is connected to the power supply line, while a predetermined threshold value is applied to the other input. The comparator here supplies an output signal, which—with suitable selection of the threshold value—"regenerates" the signal of the one sensor (namely the one with the greater amplitude). It is then also possible in respect of this comparator output signal to carry out an analysis of the combined signal in the analysis unit in order to derive not only a corresponding position signal but also a speed signal and/or a direction signal.

An appropriate threshold value is obtained when it is selected at a level between the two amplitudes of the two square signals, plus the amplitude of the supply current, the threshold value preferably where possible being in the center of the two square signals, apart from the supply current.

The output of the comparator can advantageously be connected to an input of a logic unit, a further input of which is connected to the power supply line to supply the square signals modulated on the supply current. This logic unit can be formed by a microcontroller or such module, in particular a microcontroller with an interrupt-capable input, to which the output signal of the comparator is applied.

It is also advantageous here if the logic unit is set up to analyze the modulated square signals at rising and/or falling edges of the comparator output signal by comparison with predetermined values. This allows reliable signal identification and, for example in the case of motor position signals, the precise detection of the position and therefore the speed of the motor, and also the direction of rotational movement.

The signals can originate from independent sensors, e.g. position sensors, from the position signals of which the required information—position, speed, movement direction—can be derived, the output signals of these position sensors being applied as position signals to the common supply current line.

It is however also advantageously possible to feed the two signals already within the signal unit to a logic module, as described above with reference to FIG. 2, this logic module being set up to derive other signals formed by linking the original signals, e.g. speed and rotational direction signals from position sensor output signals, and these derived signals being modulated onto the (common) supply current as the two square signals.

FIGS. 1 to 4 have already been described above.

Figure 5:
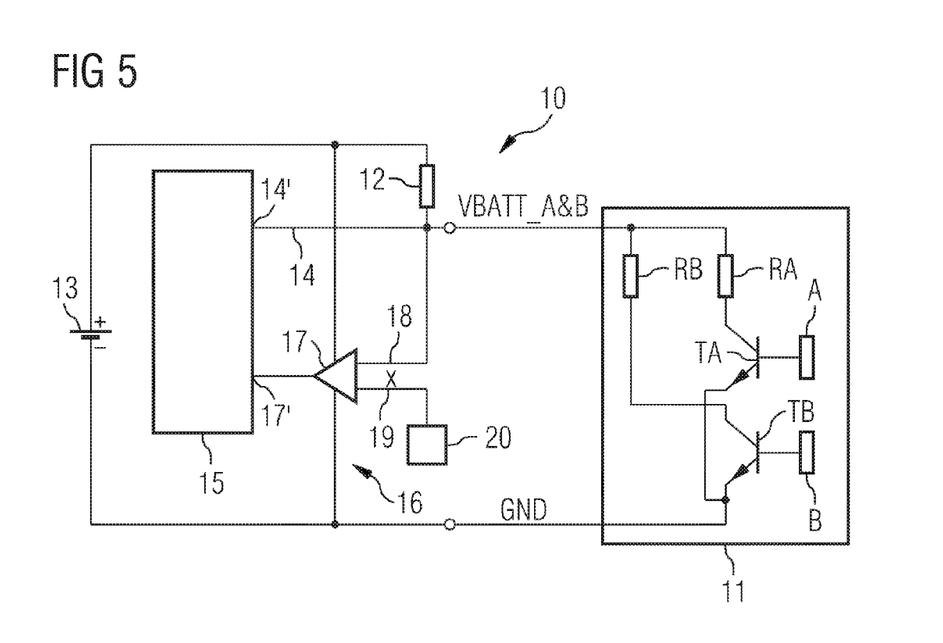
FIG. 5 shows a circuit diagram of an apparatus for detecting parameters according to an embodiment with a double sensor unit as the signal unit and an analysis unit.

FIG. 5 shows a preferred example of an apparatus 10 for detecting quadrature signals in the form of an apparatus for detecting parameters of a rotor of an electric motor (not shown in detail), with the position, speed and rotational direction of the rotor of the electric motor in particular having to be detected. To this end the apparatus 10 has a double sensor unit 11 as its signal unit, configured in principle like the one in FIG. 2 but with the difference that only two connecting lines VBATT_A&B and GND (ground line) are present.

The double sensor unit 11 specifically has two independent sensors A, B, for example Hall sensors, optical encoders, etc., and the output signals of these sensors A, B are fed for example by way of transistors TA, TB and resistors RA, RB to the power supply line VBATT_A&B, the resistors RA, RB being used to modulate the relatively out of phase square output signals of the sensors A, B and/or of the downstream amplifier transistors TA, TB onto the supply current. In order to be able to differentiate the two square signals during analysis, they are modulated onto the supply current at different amplitudes or levels and so the resistance values of the resistors RA and RB are different from one another here; for example the resistance values and/or levels of the two square signals can differ by a factor of approx. 1:2, i.e. the amplitude of the square signal relating to the sensor A can be approximately twice as big as the amplitude of the square signal relating to the sensor B.

Instead of the illustrated modulation of the supply current with the aid of the resistors RA, RB, it is of course also possible for modulation to take place here with the aid of power sources, which is known per se and does not have to be described in more detail here.

The line and/or terminal VBATT_A&B is connected in the conventional manner by way of a resistor 12 to a voltage source 13, e.g. the electrical system, i.e. the battery, of a motor vehicle, the common ground line GND also being connected to this voltage source 13. One input 14' of a logic unit 15 of an analysis unit 16 is connected to the terminal VBATT_A&B by way of a line 14 carrying the analog modulated current signal. A further input 17' is connected to the output of a comparator 17, which carries a digital comparator output signal corresponding to the modulated signal supplied by the line VBATT_A&B, see input 18 of the comparator 17, in relation to a threshold value X, which is supplied to a reference input 19 of the comparator 17 with the aid of a threshold value predetermination unit 20.

Figure 6:
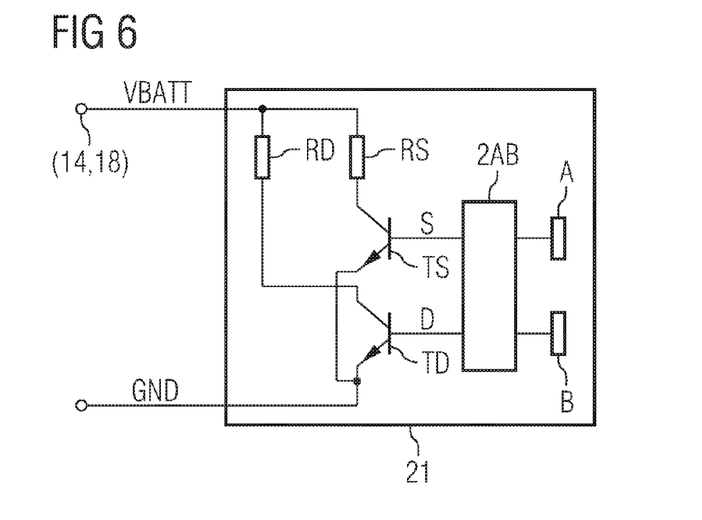
FIG. 6 shows as an alternative to FIG. 5 a circuit diagram of a modified double sensor unit, with a logic module connected to the independent sensors.

FIG. 6 shows a signal unit in the form of a modified double sensor unit 21, in which—as in FIG. 2—a logic module 2AB is connected to the two independent sensors A and B, in order thus to receive a speed signal S and a direction signal D; these signals S, D are in turn fed by way of transistors TS, TD and resistors RS, RD of different sizes to the power supply line and modulated onto the supply current—as in the embodiment according to FIG. 5. Two connecting lines—generally VBATT and GND—are therefore also sufficient here on the one hand to supply the sensor unit 21 with current and on the other hand to extract all the information from the sensor unit 21 and transmit it to the analysis unit (16 in FIG. 5).

Figure 7:
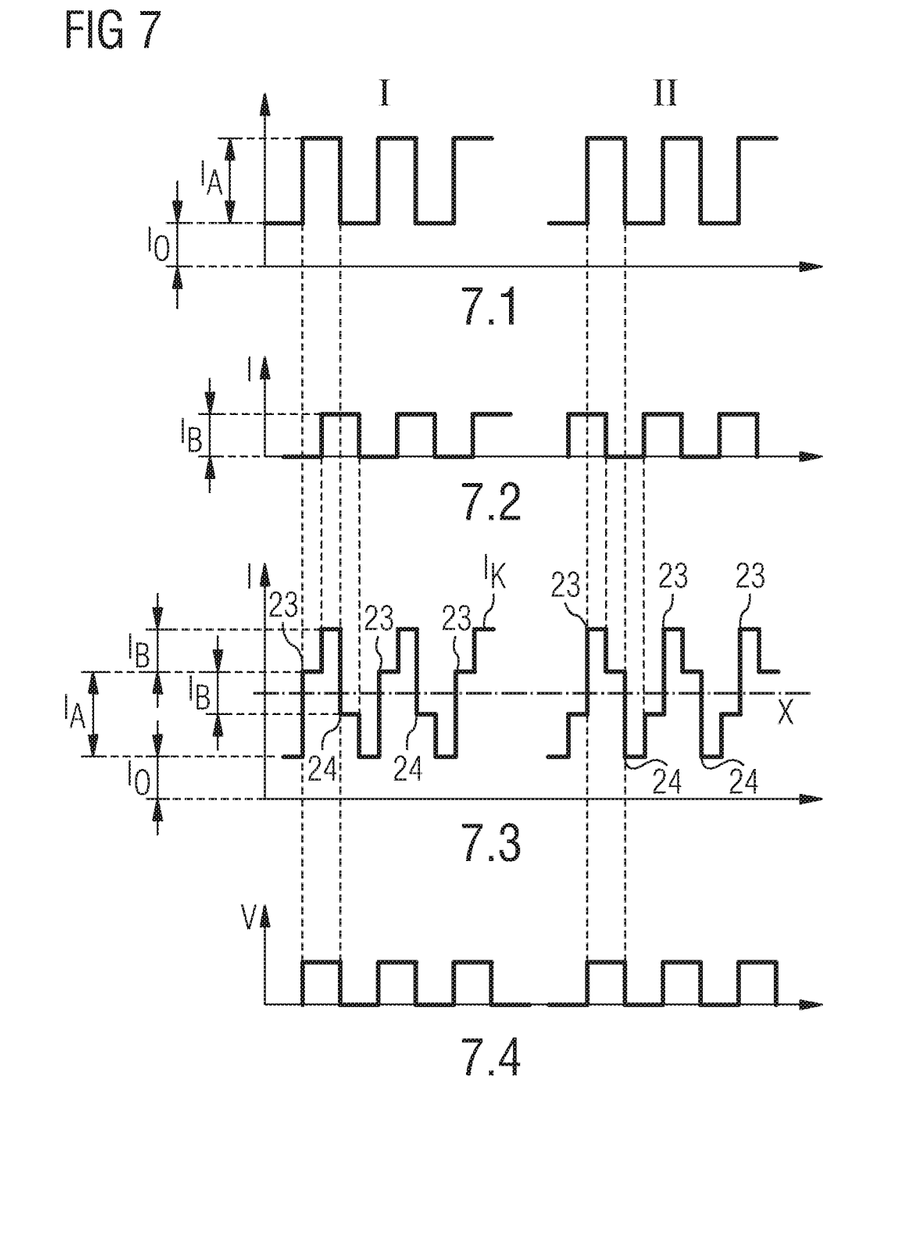
FIG. 7 shows a time diagram for the double sensor unit according to FIG. 5, to illustrate the mode of operation of the apparatus according to FIG. 5.

FIG. 7 shows the mode of operation of the apparatus 10 according to FIG. 5 using four time diagrams in four diagram lines 7.1, 7.2, 7.3 and 7.4 one above the other. Specifically line 7.1 shows the supply current $I_O$ for the sensor unit 11 (or 21) and above it the square signal originating from the sensor A, the current $I_A$. Below in line 7.2 a corresponding time diagram shows the current (the square signal) of the sensor B, in other words the current $I_B$. The third line 7.3 shows all the currents and/or signals from lines 7.1 and 7.2 combined one on top of the other (current $I_K$), i.e. it is the result of modulating the square signals (sensor signals) $I_A$ and $I_B$ onto the supply current $I_O$, the threshold value X of the comparator 17 also being shown.

The bottom line 7.4 of the overall diagram in FIG. 7 finally shows the output signal V of the comparator 17, this being a pulse signal of uniform level, which in respect of the occurrence of the pulses regenerates the signal of the sensor A, see also the pulses of the current signal $I_A$ in line 7.1. This is achieved by corresponding selection of the threshold value X, the following applying by way of example for said threshold value X:

$$X=(I_A+I_B)/2+I_O.$$

FIG. 7 shows two situations, corresponding to two different rotational directions I and II, next to one another, to illustrate how the analysis unit 16, which is essentially formed by the logic unit 15 and the comparator 17, analyzes the combined signal on the line 14 depending on the setting either at the rising edges or at the falling edges of the pulses of the comparator output signal V. If for example during the rising edge of the comparator output signal V or of the square signal of the sensor A—see the scan times 23 in FIG. 7—the level of the square signal of the sensor B is checked and the level of the square signal of the sensor B (see current $I_B$ in line 7.2 of FIG. 7) is low, a first rotational direction—instance I—is present; if however the level of the square signal of the sensor B is high (i.e. the pulses $I_B$ are in front of the pulses $I_A$), the counter rotational direction II is present. Additionally or alternatively the analysis can be triggered by the falling edge of the square signal of the sensor A and/or of the comparator output signal V, see the scanning times 24 in FIG. 7. If it turns out here that the level of the signal of the sensor B is high at scanning times 24, the rotational direction I is present but if the level of the signal of the sensor B is low, the rotational direction II is present.

Figure 8:
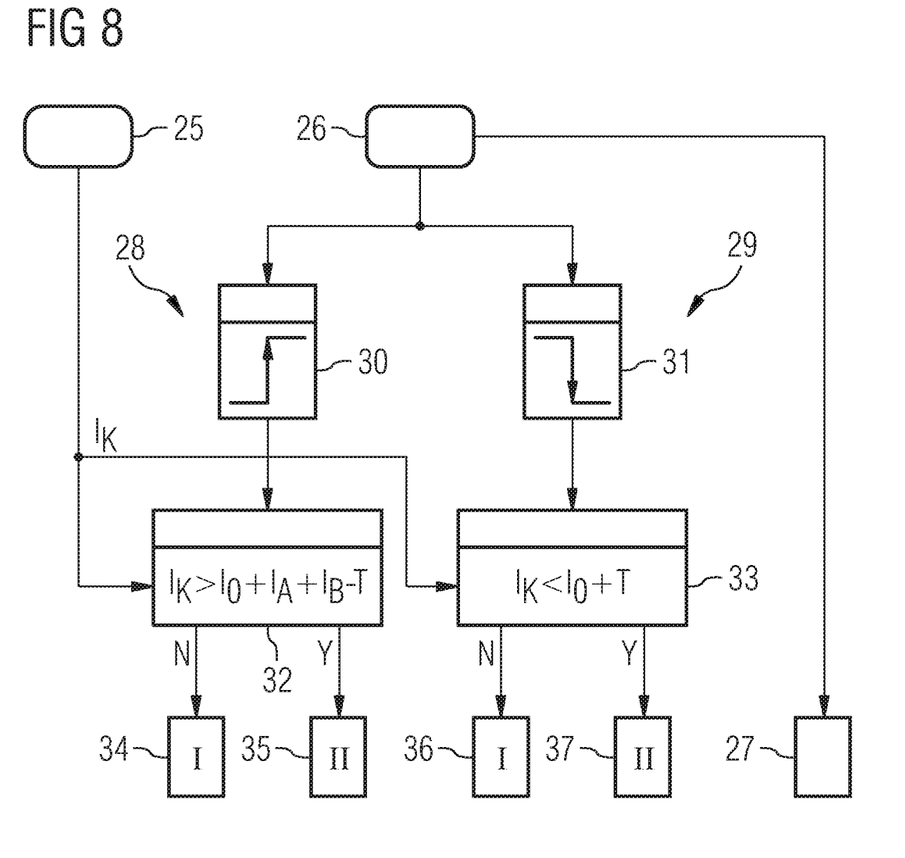
FIG. 8 shows a diagram showing the function of this apparatus and in particular that of the analysis unit contained therein in a modified manner.

As far as the actuation and mode of operation of the logic unit 15 are concerned, this sequence is shown with a certain level of modification in FIG. 8. Here the field 25 shows the supply of the combined current (at the input 14' of the logic unit 15 according to FIG. 5) and the field 26 shows the transmission of the output state of the comparator 17 (at the input 17' of the logic unit 15). This comparator state, i.e. the comparator output signal V according to FIG. 7, can be used directly as a position signal, as shown in FIG. 8 with a block 27.

As far as determining the rotational direction is concerned, for safety reasons both the variants described above with reference to FIG. 7 are preferably carried out in combination, with one calculation triggered by a rising edge of the pulse signal V and one calculation triggered by the falling edge, see the two branches 28 and 29 in FIG. 8. The blocks 30 and 31 here illustrate the use of the rising edge (Block 30) and the falling edge (Block 31). The combined current $I_K$ is then fed to the input 14' of the logic unit 15 for comparison purposes and compared in the logic unit 15 according to blocks 32 and 33 with predetermined values $I_O+I_A+I_B-T$ and/or $I_O+T$, the currents $I_O$, $I_A$ and $I_B$ having the significance described above with reference to FIG. 7 and a tolerance variable relating to component tolerances in the circuit being taken into account with T. If it turns out during the comparison according to block 32 that the value $I_K$ of the combined current is not greater than the predetermined value $I_O+I_A+I_B-T$, see output N, rotational direction I is decided (output block 34). If however the condition $I_K>I_O+I_A+I_B-T$ applies, see output Y of block 32, rotational direction II is decided (output block 35).

If the analysis is triggered by the falling edges of the comparator output signal, see branch 29 in FIG. 8, a rotational direction I is determined, if $I_K$ is not smaller than $I_O+T$; otherwise rotational direction II is decided, see output blocks 36 and 37 corresponding to output blocks 34, 35 in branch 28.

Figure 9:
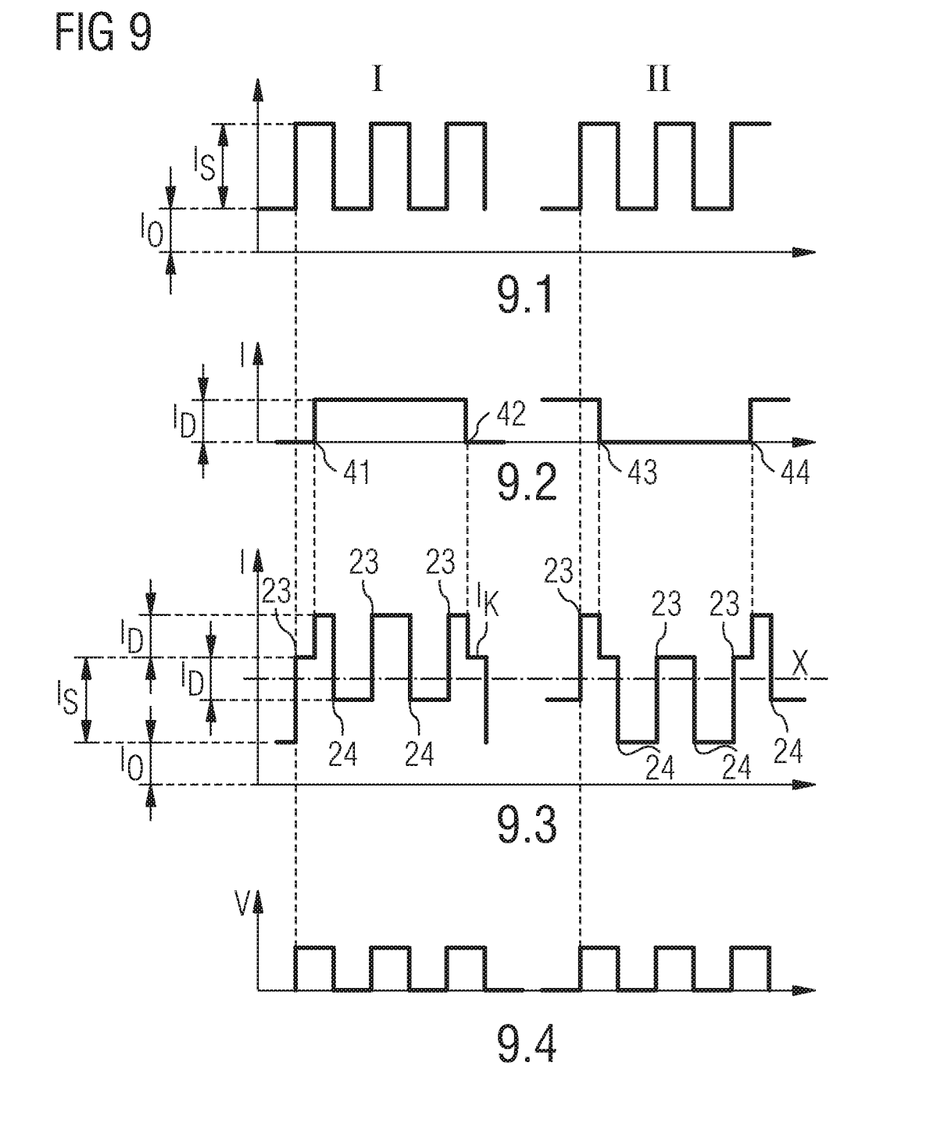
FIG. 9 shows a time diagram like FIG. 7 illustrating the sequences when a double sensor unit according to FIG. 6 is deployed in the apparatus according to FIG. 5.

FIG. 9 shows a combined time diagram like FIG. 7 illustrating the situation when a modified double sensor unit according to FIG. 6 is used, in which on the one hand a speed signal—current $I_S$—and on the other hand a direction signal—current $I_D$—are received as output signals of the sensor unit 21, see lines 9.1 and 9.2 in FIG. 9. The points 41, 42, 43 and 44 in line 9.2 in FIG. 9 respectively illustrate a rotational direction reversal of the motor (not shown in detail). Line 9.3 again shows the combined current $I_K$, which is made up of the components $I_O$ (supply current), $I_S$ (speed signal current) and $I_D$ (direction signal current). As in FIG. 7, scanning times 23 are again shown (for scanning at rising edges of the comparator output signal V, see line 9.4, and/or of the speed current signal $I_S$) and at 24 the scanning times are shown at the corresponding falling edges of said pulses. It is therefore possible correspondingly here to derive not only information relating to the speed (by regenerating current pulses $I_S$ based on the comparator output pulses, line 9.4) but also information relating to the respective rotational direction of the motor, as described above with reference to FIGS. 7 and 8.

The analysis unit 16 (see FIG. 5) can always detect the position data of the motor correctly here too based on the speed data and the rotational direction data.

In all the instances described above a combined signal is transported by way of a single line VBATT, instead of by way of two separate lines as before, to the actual analysis unit 16. In the case of the modified signal and/or sensor unit 21 according to FIG. 6 it should be noted that the resistors RS and RD should be selected so that the amplitude of the signal is above the threshold X of the comparator 17 in all motor rotational direction situations. This also ensures, as in the instance in FIG. 7, that the comparator output signal V corresponds to the speed signal according to line 9.1 in FIG. 9.

As is now clear the number of lines to be used is reduced by the described technology, to a minimum of the two lines required in principle for power supply purposes. This small number of lines means that fewer plug-type pins are also required on the part of the sensor units and on the part of the analysis unit, resulting in a smaller plug volume and therefore a smaller space requirement. The reduced number of lines and plug-type pins also means that there is a weight reduction as well as a lower probability of failure and a smaller structural space is required. These advantages also mean greater flexibility and lower costs.

These advantages are also achieved correspondingly when quadrature signals from a signal unit are to be supplied and analyzed quite generally. Of specific importance for achieving the advantages is the described form of encoding of the at least two signals of the signal unit, it being possible for other measuring means, such as a glass measuring rod, etc., to be present as the point of origin for the signals, in addition to a sensor unit. However the invention is preferably used in the field of motor vehicles, and here in particular for the detection of parameters such as position, rotational direction or speed of a rotor of an electric motor.

The invention claimed is:

1. An apparatus comprising:
   a signal unit and
   an evaluation unit which is or can be connected to said signal unit, for detecting quadrature signals of the signal unit, wherein the signal unit comprises a single power supply line and a ground line and during operation emitting at least two out of phase square signals for analysis in the analysis unit, wherein the signal unit is operable to apply the two out of phase square signals at different amplitudes to the single power supply line, both square signals being modulated onto the supply current supplied by way of the power supply line, and wherein the analysis unit comprises a comparator, one input of which is or can be connected to the single power supply line, while a predetermined threshold value is applied to the other input.

2. The apparatus according to claim 1, wherein the two square signals are applied by way of mutually different resistors to the common power supply line.

3. The apparatus according to claim 1, wherein the threshold value has a level between the two amplitudes of the two square signals plus the amplitude of the supply current.

4. The apparatus according to claim 1, wherein the output of the comparator is connected to an input of a logic unit, which is connected at a further input to the power supply line to supply the square signals modulated onto the supply current.

5. The apparatus according to claim 4, wherein the logic unit is set up to analyze the modulated square signals at at least one of rising and falling edges of the comparator output signal by comparison with predetermined values.

6. The apparatus according to claim 1, wherein the signal unit is a sensor unit with at least two sensors.

7. according to claim 6, wherein the sensors are position sensors of an electric motor.

8. The apparatus according to claim 1, wherein the signals per se are applied to the common supply current line.

9. The apparatus according to claim 1, wherein the signal unit comprises a logic module, which is set up to derive signals formed by linking the original signals, the square signals being modulated onto the supply current according to these derived signals.

10. The apparatus according to claim 9, wherein the signals formed by linking the original signals are speed and rotational direction signals formed from position sensor output signals.

11. An method for detecting quadrature signals of a signal unit comprising a single power supply line and a ground line, the method comprising the steps of:
    emitting at least two out of phase square signals for analysis in an analysis unit,
    applying the two out of phase square signals at different amplitudes to the single power supply line, both square signals being modulated onto the supply current supplied by way of the power supply line, and
    comparing the signal on the single power supply line with a predetermined threshold value.

12. The method according to claim 11, wherein the two square signals are applied by way of mutually different resistors to the common power supply line.

13. The method according to claim 11, wherein the threshold value has a level between the two amplitudes of the two square signals plus the amplitude of the supply current.

14. The method according to claim 11, comprising the steps of connecting an output of a comparator to an input of a logic unit, which is connected at a further input to the power supply line to supply the square signals modulated onto the supply current.

15. The method according to claim 14, comprising the step of analyzing the modulated square signals at at least one of rising and falling edges of the comparator output signal by comparison with predetermined values.

16. The method according to claim 11, wherein the signal unit is a sensor unit with at least two sensors.

17. The method according to claim 16, wherein the sensors are position sensors of an electric motor.

18. The method according to claim 11, wherein the signals per se are applied to the common supply current line.

19. The method according to claim 11, comprising the step of deriving signals formed by linking the original signals, wherein the square signals are modulated onto the supply current according to these derived signals.

20. The method according to claim 19, wherein the signals formed by linking the original signals are speed and rotational direction signals formed from position sensor output signals.

* * * * *